(12) United States Patent
Jeon et al.

(10) Patent No.: US 8,765,078 B2
(45) Date of Patent: Jul. 1, 2014

(54) BIOCHIP STAMPING DEVICE AND STAMPING METHOD THEREOF

(75) Inventors: Sang Youl Jeon, Seoul (KR); Bo Sung Ku, Gyunggi-do (KR); Hee Ju Son, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 227 days.

(21) Appl. No.: 13/358,880

(22) Filed: Jan. 26, 2012

(65) Prior Publication Data
US 2013/0047399 A1 Feb. 28, 2013

(30) Foreign Application Priority Data
Aug. 29, 2011 (KR) .................... 10-2011-0086521

(51) Int. Cl.
*G01N 21/01* (2006.01)
*G01N 21/00* (2006.01)
*G01N 33/48* (2006.01)
*B01L 99/00* (2010.01)

(52) U.S. Cl.
USPC ........... 422/509; 422/292; 422/300; 422/400; 422/68.1; 422/501; 422/520; 436/43; 436/180; 436/519; 436/532; 435/6.12; 435/285.1; 435/287.1; 264/131; 506/40

(58) Field of Classification Search
None
See application file for complete search history.

(56) References Cited

U.S. PATENT DOCUMENTS

| | | | |
|---|---|---|---|
| 7,347,975 B2 * | 3/2008 | Vann et al. ..................... | 422/500 |
| 2005/0169808 A1 * | 8/2005 | Pinkel et al. .................. | 422/100 |
| 2007/0020800 A1 * | 1/2007 | Ishikawa et al. .............. | 438/106 |
| 2009/0221441 A1 | 9/2009 | Lee et al. | |
| 2011/0018259 A1 * | 1/2011 | Arnold et al. ................. | 285/328 |
| 2011/0133345 A1 * | 6/2011 | Tasaki et al. .................. | 257/783 |

FOREIGN PATENT DOCUMENTS

| | | |
|---|---|---|
| JP | 2011-013000 | 1/2011 |
| KR | 10-2002-0041172 A | 6/2002 |

* cited by examiner

*Primary Examiner* — Jill Warden
*Assistant Examiner* — Timothy G Kingan
(74) *Attorney, Agent, or Firm* — McDermott Will & Emery LLP

(57) ABSTRACT

There is provided a biochip stamping device. The biochip stamping device includes a stamping jig in which a first biochip is aligned; an inverting mechanism vertically inverting a second biochip; and a movement mechanism transferring the vertically inverted second biochip on the stamping jig to combine the first biochip and the second biochip.

12 Claims, 12 Drawing Sheets

BIOCHIP STAMPING DEVICE AND STAMPING METHOD THEREOF

CROSS-REFERENCE TO RELATED APPLICATIONS

This application claims the priority of Korean Patent Application No. 10-2011-0086521 filed on Aug. 29, 2011, in the Korean Intellectual Property Office, the disclosure of which is incorporated herein by reference.

BACKGROUND OF THE INVENTION

1. Field of the Invention

The present invention relates to a stamping device, and more particularly, to a biochip stamping device, which may precisely stamp a data analysis toxicology assay chip (data chip) and a metabolizing enzyme toxicology assay chip (meta chip).

2. Description of the Related Art

A biochip is a chip in which DNA, proteins, enzymes, other ligands, a pattern of a DNA base sequence of a disease, other chemical and biological samples, and the like, are densely integrated and combined on a surface of a solid (silicon, metal, glass, and the like) to be micro-arrayed or micro-fluidized.

The biochip may allow pharmaceuticals, cosmetics, and the like to be subjected to a toxicity test, and the biochip used in the toxicity test may be referred to as a data analysis toxicology assay chip, or simply as a data chip.

The toxicity test performed using the data chip may be determined such that a data chip in which biological cells are cultured and a metabolizing enzyme toxicology assay chip, (hereinafter, referred to as a "meta chip") in which a variety of chemicals or newly developed drugs are included, are combined, and then an inspection of changes in the biological cells due to the combining may be carried out. The combining of the data chip and the meta chip may be carried out such that each chip is fixed to a stampling jig, and a position thereof may be adjusted using a pin. Thereafter, when two biochips in mutual combining are fixed and the jig is removed, a biochip in which the data chip and the meta chip are coupled may be obtained.

However, in the related art, a stamping operation has been performed manually, thereby decreasing productivity. In particular, since the stamping operation described above has been required to be repeatedly performed about seven to ten times, there is a demand for reliability of the stamping operation capable of obtaining the same experimental result even though the stamping operation is repeatedly performed.

SUMMARY OF THE INVENTION

An aspect of the present invention provides a biochip stamping device allowing for accurate combining between a data analysis toxicology assay chip (hereinafter, referred to as a "data chip") and a metabolizing enzyme toxicology assay chip (hereinafter, referred to as a "meta chip").

According to an aspect of the present invention, there is provided a biochip stamping device, including: a stamping jig in which a first biochip is aligned; an inverting mechanism vertically inverting a second biochip; and a movement mechanism transferring the vertically inverted second biochip on the stamping jig to combining the first biochip and the second biochip.

The stamping jig may include a guide pin for aligning a position of the first biochip and a position of the second biochip.

The biochip stamping device may further include a cover preventing the first biochip and the second biochip from being contaminated by an external foreign substance.

The biochip stamping device may further include an air conditioner adjusting a temperature of the inside of the cover.

The air conditioner may include a humidifier.

The biochip stamping device may further include a first support and a second support on which the first biochip and the second biochip being on standby are respectively placed.

The first support and the second support may include a clip for fixing each of the first biochip and the second biochip.

The first support or the second support may include a vacuum suction unit for fixing the first biochip.

The movement mechanism may include: a first guide member formed in a first direction; a second guide member movable along the first guide member, and formed in a second direction perpendicular to the first direction; a third guide member movable along the second guide member, and formed in a direction perpendicular to each of the first guide member and the second guide member; and a head member movable along the third guide member, and picking up and moving at least one of the first biochip and the second biochip.

The head member may include an suction unit for suction the biochip.

The inverting mechanism may include: a gripping unit gripping the first biochip or the second biochip; and a driving unit vertically inverting the first biochip or the second biochip by rotating the gripping unit.

The inverting mechanism may include: a fixing plate fixed on the biochip stamping device; a pair of movable members mounted on the fixing plate, and movable in a direction thereof; a plurality of gripping members rotatably mounted on the pair of movable members, and gripping the first biochip or the second biochip; and a rotation unit rotating the plurality of gripping members.

The rotation unit may include: a first pulley rotatably mounted on the movable member; a second pulley mounted on each of the plurality of gripping members; a belt connecting the first pulley and the second pulley; and a driving motor rotating the first pulley.

According to another aspect of the present invention, there is provided a stamping method for a biochip, including: aligning a first biochip in a stamping jig; vertically inverting a second biochip using an inverting mechanism; mounting the vertically inverted second biochip on the stamping jig; and combining the first biochip and the second biochip.

The stamping method may further include separating the combined first and second biochips.

The first biochip may be fixed by a vacuum suction unit of a first support.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings.

In the following description of the invention, terms referring to components of the invention are named considering functions of the respective components, and thus will not be understood as being limited to technical components of the invention.

According to the embodiments of the present invention, a stamping operation of a biochip which has been performed manually may be performed automatically, through a mechanism capable of moving and vertically inverting the biochip. In this manner, the biochip may be moved and inverted within the mechanism, thereby significantly reducing contamination of the biochip.

In addition, according to the embodiments of the present invention, a first biochip (for example, a meta chip) and a second biochip (for example, a data chip) may be precisely stamped through a stamping jig with a guide pin formed therein, and the stamping operation may be repeatedly performed.

Accordingly, the present invention may be effectively used for a drug test, or the like, on living tissues, typically requiring a stamping operation repeated by more than seven times.

Hereinafter, a biochip stamping device according to an embodiment of the present invention having the above described effects will be described.

Figure 1:
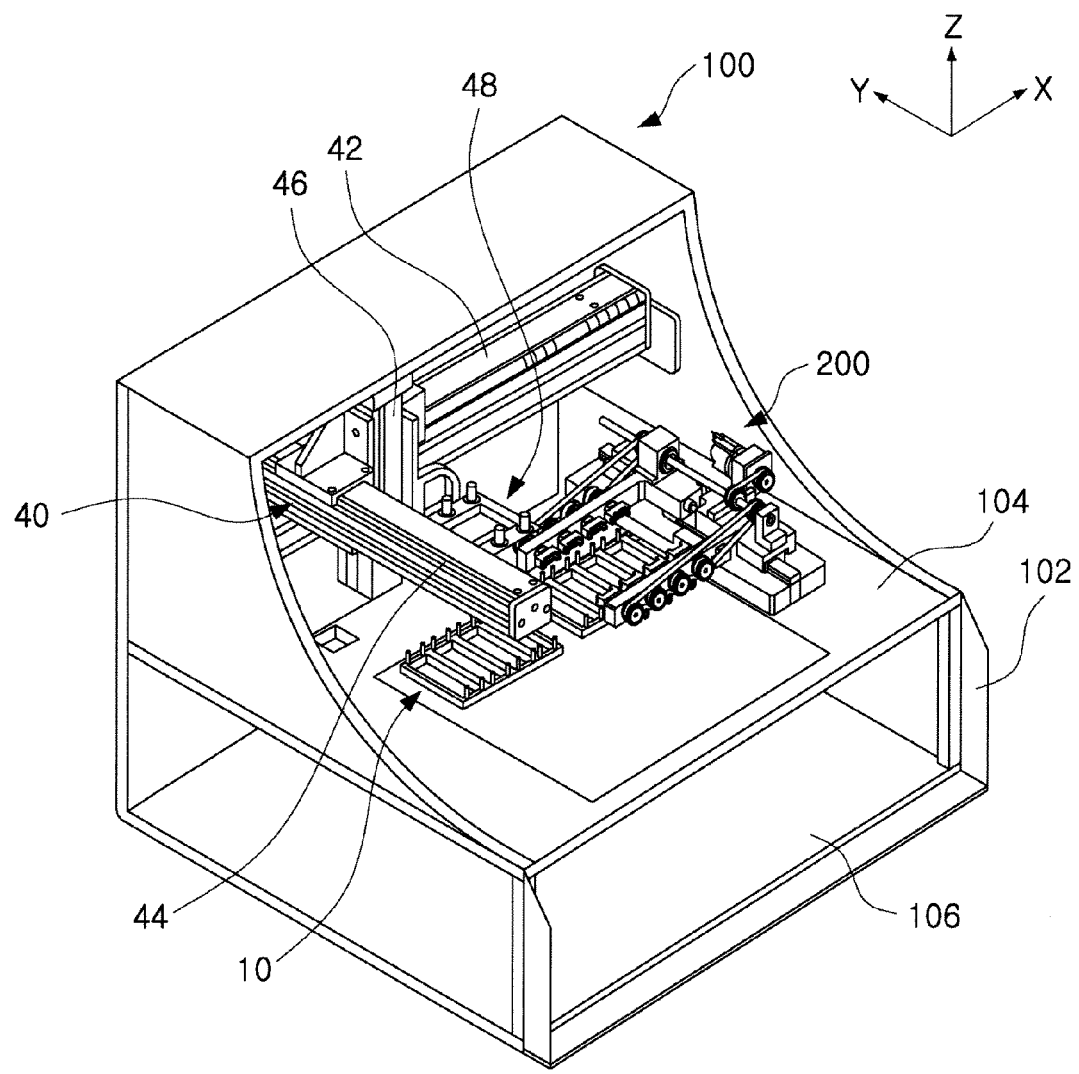
FIG. 1 is a perspective view of a biochip stamping device according to a first embodiment of the present invention.
Figure 2:
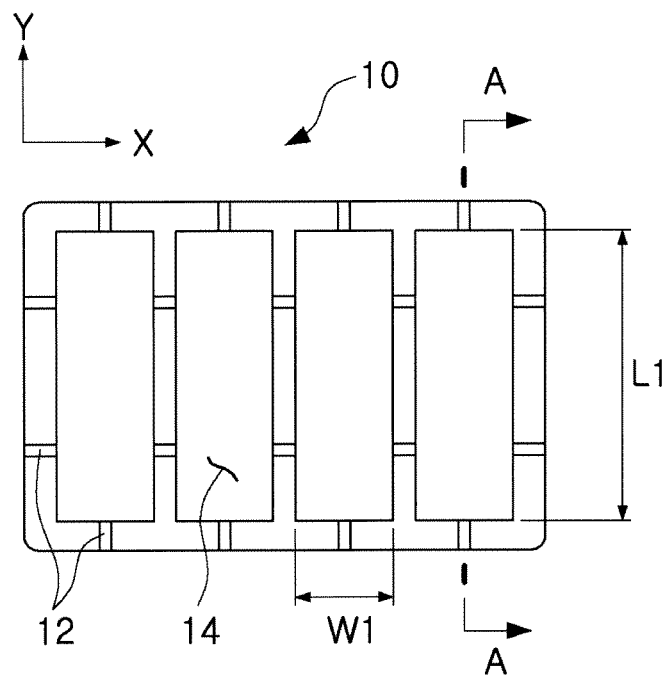
FIGS. 2 and 3 are a plan view and an A-A cross-sectional view of a stamping jig shown in FIG. 1.
Figure 3:
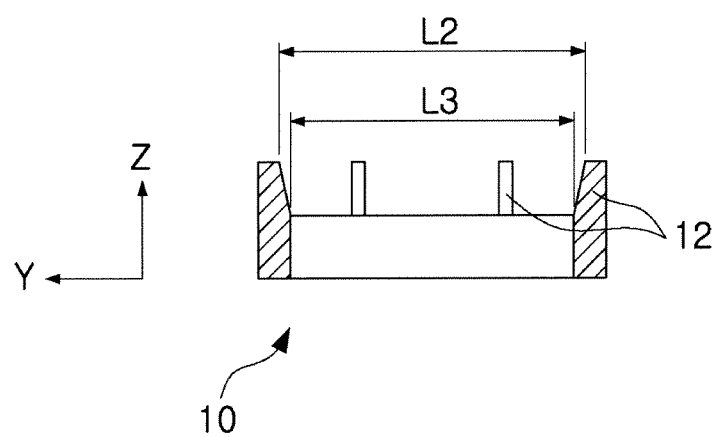
Figure 4:
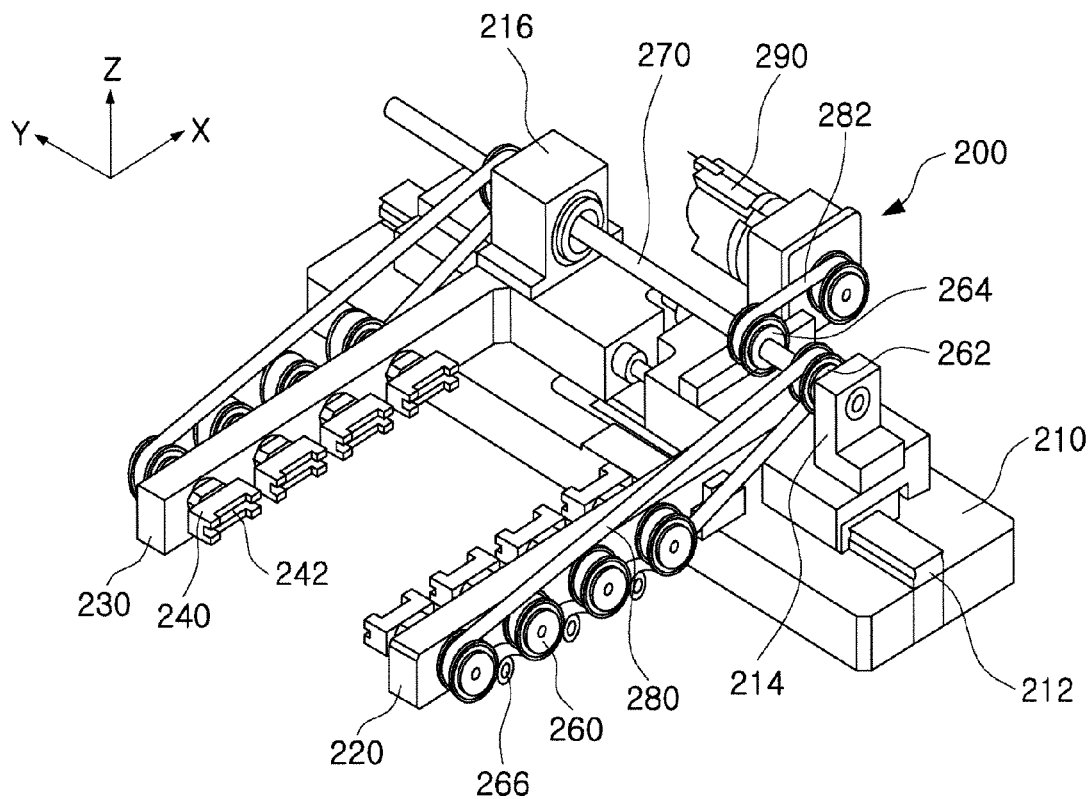
FIG. 4 is an expanded perspective view of an inverting mechanism shown in FIG. 1.
Figure 5:
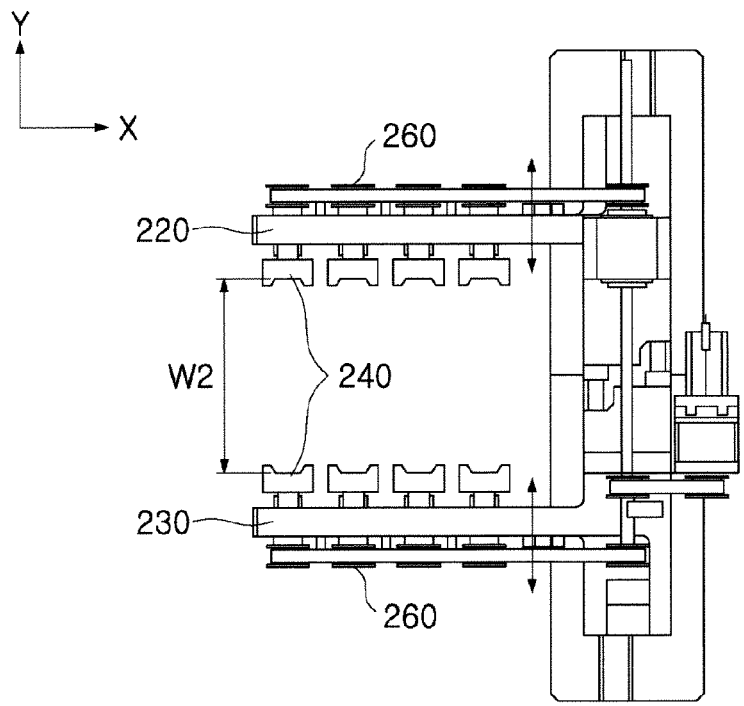
FIGS. 5 and 6 are a plan view and a side view of an inverting mechanism shown in FIG. 1.
Figure 6:
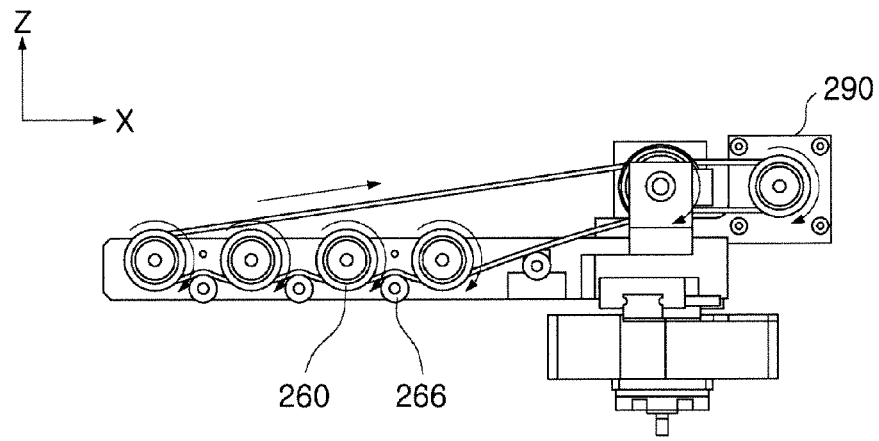
Figure 7:
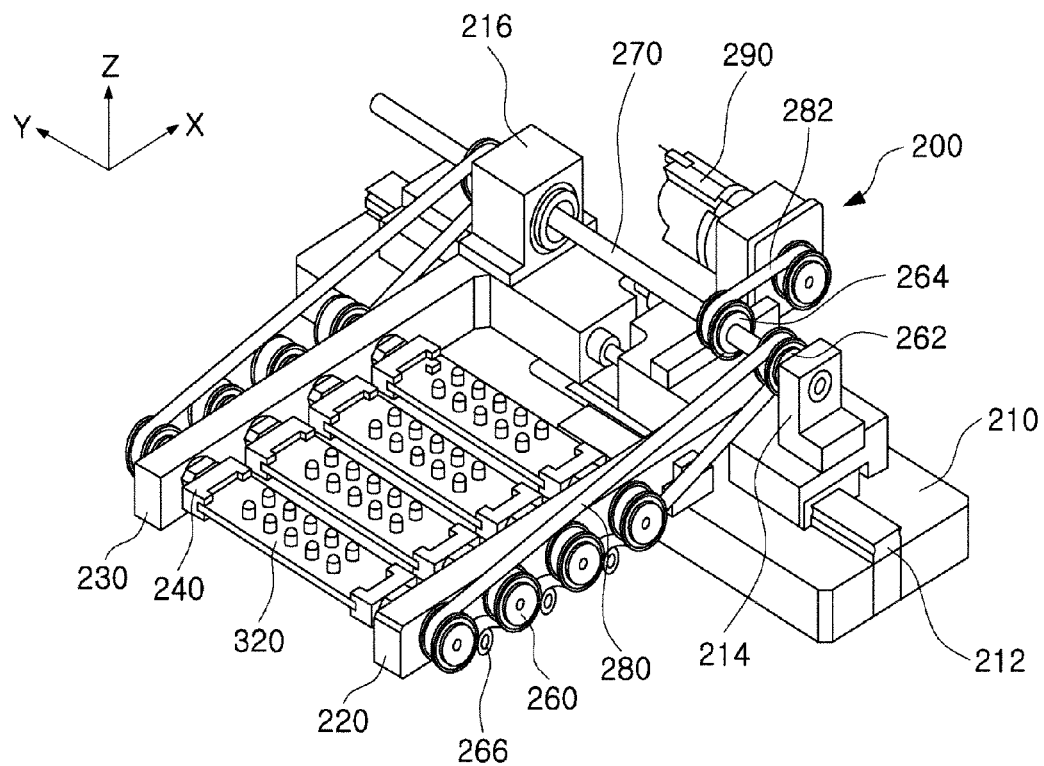
FIG. 7 is a perspective view of a use state for describing an operation principle of an inverting mechanism shown in FIG. 1.
Figure 8:
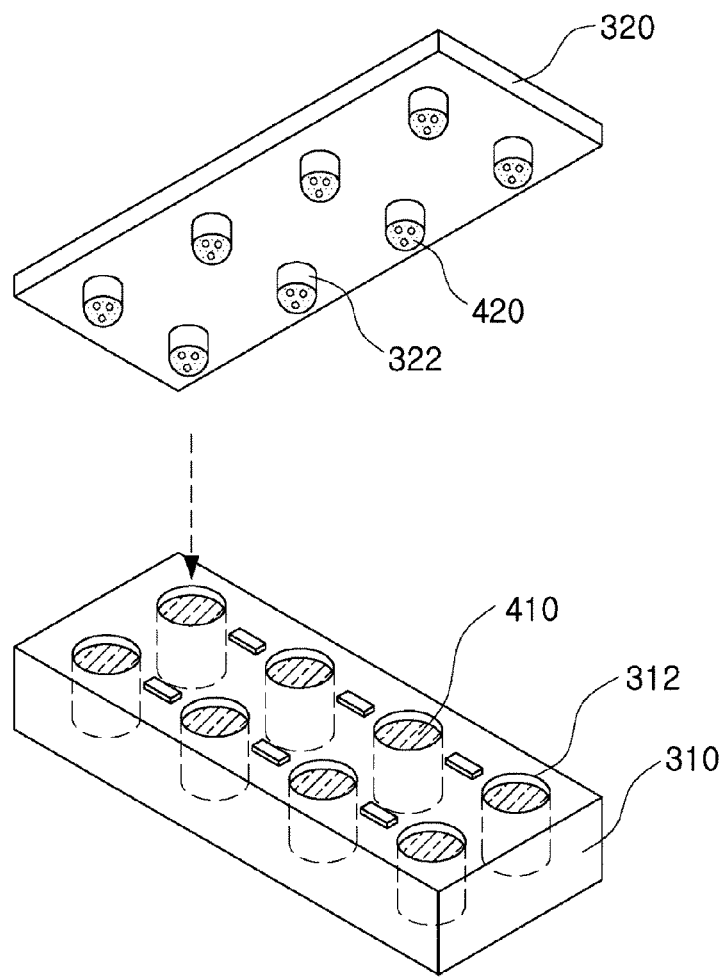
FIGS. 8 and 9 are a separation perspective view of a first biochip and a second biochip used in a biochip stamping device shown in FIG. 1, and a cross-sectional view of a coupling state of the first biochip and the second biochip.
Figure 9:
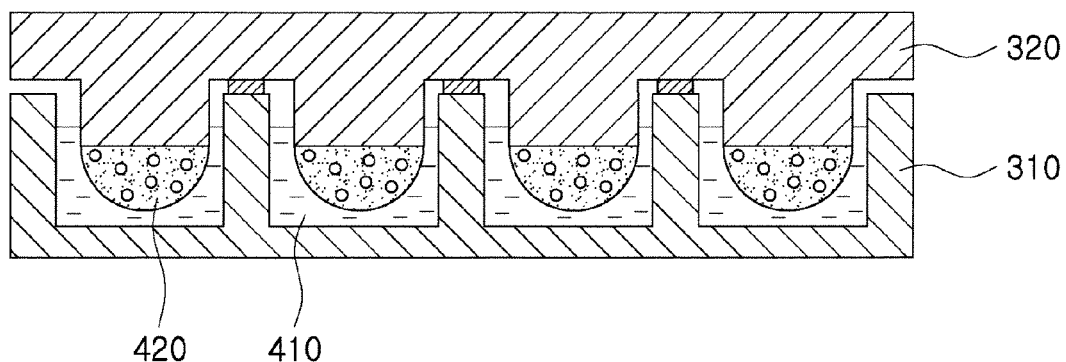

FIG. 1 is a perspective view of a biochip stamping device according to a first embodiment of the present invention, FIGS. 2 and 3 are a plan view of a stamping jig and a cross-sectional view of a stamping jig taken along line A-A in FIG. 1, FIG. 4 is an expanded perspective view of an inverting mechanism shown in FIG. 1, FIGS. 5 and 6 are a plan view and a side view of an inverting mechanism shown in FIG. 1, FIG. 7 is a perspective view of a use state for describing an operation principle of an inverting mechanism shown in FIG. 1, FIGS. 8 and 9 are a separation perspective view of a first biochip and a second biochip used in a biochip stamping device shown in FIG. 1 and a cross-sectional view of a coupling state of the first biochip and the second biochip shown in FIG. 1, and FIGS. 10 through 13 are views of a stamping operation through a biochip stamping device shown in FIG. 1.

A biochip stamping device 100 according to a first embodiment of the present invention may include a body 102, a stamping jig 10, an inverting mechanism 200 having a rotation unit, and a movement mechanism 40, and may further include a controller (not shown) for controlling components selectively described above.

The body 102 may configure an appearance of the biochip stamping device 100, and include a flat plate 104 on which the above described components are mounted. The body 102 may be formed of a metallic material or a material having strong chemical resistance. Also, the body 102 may include a plurality of legs (not shown) of which heights may be individually adjusted, thereby maintaining the flat plate 104 in a horizontal state. In addition, the body 102 may include a compartment 106 in which separate additional devices are mounted, and may include wheels for easy movement thereof.

The stamping jig 10 may be mounted on a side of the flat plate 104. The stamping jig 10 may include a plurality of seating units 14 for receiving a plurality of biochips, as shown in FIGS. 2 and 3. Here, the seating unit 14 may have the same or a similar width (W1) and length (L1) to those of the size of the biochip.

The stamping jig 10 may further include a guide pin 12 to enable the biochip to be accurately put on each of the plurality of seating units 14. The guide pin 12 may be formed around of the seating unit 14. According to the present embodiment, two guide pins may be respectively formed in left and right sides of the seating unit 14, and a single guide pin may be respectively formed in front and rear sides thereof; however, the number of the guide pins may be increased or reduced, as necessary. Meanwhile, a distance between the guide pins 12 facing each other with the seating unit 14 interposed therebetween may be the same as the width (W1) or the length (L1) of the seating unit 14. Alternatively, a distance (L2 and L3) between the guide pins 12 may become the same as the width (W1) or the length (L1) of the seating unit 14 as it goes downward (in a -Z-axis direction). That is, the distance (L2) may be greater than the width (W1) or length (L1) of the seating unit 14, and the distance (L3) may be the same as the width (W1) or length (L1) of the seating unit 14.

Here, the latter may be appropriate to alignment of the biochip in comparison with the former. For reference, the guide pin 12 may be formed of a material (for example, natural rubber, synthetic rubber, plastics, etc.) relatively softer than the biochip so that damage of the biochip is not caused at the time of a collision therewith.

The inverting mechanism 200 may include a fixing plate 210, movable members 220 and 230, and a gripping member 240.

The fixing plate 210 may be fixed to the flat plate 104. The fixing plate 210 may include a guide rail 212 for reciprocating movement of the movable member 220. The guide rail 212 may be formed in a Y-axis direction as shown in FIG. 4.

The movable members 220 and 230 may be movably mounted on the fixing plate 210. The movable members 220 and 230 may be formed of two symmetrical members. Here, at least one of the first movable member 220 and the second movable member 230 may be fixed to the fixing plate 210, and the other may be movably mounted on the fixing plate 210. Alternatively, both the first movable member 220 and the second movable member 230 may be movably mounted on the fixing plate 210. In any case, a width (W2) between the first movable member 220 and the second movable member 230 may be adjusted depending on user's convenience.

The gripping member 240 may be rotatably mounted on the movable members 220 and 230. Specifically, the gripping members 240 may be mounted at prescribed intervals in a longitudinal direction (X-axis direction) of the movable members 220 and 230, and may be mounted on inwardly opposed faces of the first movable member 220 and the second movable member 230. The gripping member 240 may have a shape for gripping the biochip, or a groove 242 to which the biochip is inserted.

The gripping members 240 mounted on the first movable member 220 and the second movable member 230 may be formed as pairs. That is, the gripping member 240 of the first movable member 220 and the gripping member 240 of the second movable member 230 may be used to grip a single biochip. Accordingly, when four pairs of gripping members 240 are mounted on the movable members 220 and 230, four biochips may be gripped simultaneously. For reference, the number of the gripping members 240 according to the present embodiment may merely be an example, and may be increased or reduced, as necessary.

The rotation unit may include a plurality of pulleys 260, 262, 264, and 266, a shaft 270, belts 280 and 282, and a driving motor 290.

A first pulley 260 may be mounted on the other surface of the movable members 220 and 230, and coupled with the gripping member 240. That is, the first pulley 260 may be coupled with each of the gripping members 240 disposed in corresponding positions with respect to the movable members 220 and 230 to thereby be rotated together with the gripping members 240. For reference, to realize smooth rotational movement of the first pulley 260 and the gripping member 240, the first pulley 260 or the gripping member 240 may be mounted on the movable members 220 and 230 via a bearing.

The second pulley 262 may be mounted on the movable members 220 and 230. Specifically, the second pulley 262 may be mounted on the shaft 270 fixed to the movable members 220 and 230, and rotatably moved together with the shaft 270. Meanwhile, the second pulley 262 may be respectively positioned on both ends of the shaft 270 so as to be connected with the first pulley 260 through the first belt 280.

The third pulley 264 may be fixed to the shaft 270. The third pulley 264 may be rotatably moved together with the shaft 270, similarly to the second pulley 262, and may be connected with a driving shaft of the driving motor 290 through the second belt 282.

An auxiliary pulley 266 may be rotatably mounted on the movable members 220 and 230. Specifically, the auxiliary pulley 266 may be mounted between the first pulleys 260. The auxiliary pulley 266 may adjust the tension of the first belt 280 exerted on the first pulley 260, and prevent the first belt 280 from being separated from the first pulley 260.

The shaft 270 may be fixed to the movable members 220 and 230. Specifically, the shaft 270 may be rotatably mounted on a first support 214 fixed to the first movable member 220 and a second support 216 fixed to the second movable member 230. Here, the shaft 270 coupled with the first support 214 may provide only rotary movement; however, the shaft 270, coupled with the second support 216, may provide rotating movement and linear movement (in a Y-axis direction).

Accordingly, when the first movable member 220 is moved in the Y-axis direction, the shaft 270 may be moved together with the first movable member 220, however, when the second movable member 230 is moved in the Y-axis direction, the shaft 270 may not be moved together therewith (that is, the shaft 270 may provide relative linear movement with respect to the second movable member 230).

Meanwhile, according to the present embodiment, the pulley and the belt have been shown and described as the rotation unit of the gripping member 240; however, a gear may be substituted for the pulley and the belt, as necessary. Also, although not shown, a sensor for sensing whether the biochip is positioned between the gripping members 240 may be further included.

Hereinafter, an operation principle of the inverting mechanism 200 configured as above will be described with reference to FIG. 7.

When the biochip to be inverted is moved to the inverting mechanism 200, the first movable member 220 and the second movable member 230 may increase a distance between the movable members 220 and 230 so as to pick up a biochip 320. Here, the distance between the movable members 220 and 230 may be adjusted in such a manner that the first movable member 220 is moved in a −Y-axis direction, or the second movable member 230 is moved in a +Y-axis direction. Alternatively, both the first movable member 220 and the second movable member 230 may be moved in the different directions, so that the distance between the movable members 220 and 230 may be adjusted.

When the distance between the movable members 220 and 230 is increased enough to receive the biochip 320, the biochip 320 may be positioned between the first movable member 220 and the second movable member 230. Thereafter, when the distance between the movable members 220 and 230 is reduced, the biochip 320 may be gripped by a pair of gripping members 240.

When the biochip 320 is stably gripped by the pair of gripping members 240, the driving motor 290 may be driven. When the driving motor 290 is driven, the rotating force of the driving motor 290 may be transmitted to the third pulley 264 via the second belt 282. Therefore, the shaft 270 may be rotated. Here, since the second pulley 262 as well as the third pulley 264 may be coupled to the shaft 270, the second pulley 262 may be rotated when the shaft 270 is rotated. In addition, since the second pulley 262 is connected with the first pulley 260 via the first belt 280, the first pulley 260 may be rotated in the same direction as that of the second pulley 262 when the second pulley 262 is rotated in a single direction (a clockwise direction based on FIG. 7).

Here, since the gripping members 240 are connected to the first pulley 260, the gripping members 240 and the biochip fixed to the gripping member 240 may be rotated together when the first pulley, 260 is rotated. Accordingly, when the magnitude of the rotation of the driving motor 290 is adjusted, a plurality of biochips gripped by the gripping members 240 may be vertically inverted in a simultaneous manner.

Referring again to FIG. 1, a movement mechanism 40 of the biochip stamping device according to a first embodiment will be described.

The movement mechanism 40 may include a first guide member 42, a second guide member 44, a third guide member 46, and a head member 48, as shown in FIG. 1.

The first guide member 42 may be extended in an X-axis direction based on FIG. 1. The first guide member 42 may include a rail for a rolling movement or a sliding movement, or a configuration corresponding to the rail. In addition, the first guide member 42 may further include a separate driving unit for allowing reciprocating movement of the second guide member 44.

The second guide member 44 may be extended in a Y-axis direction. The second guide member 44 may be coupled with the first guide member 42, and reciprocate in an X-axis direction along the first guide member 42. For this, the second guide member 44 may further include a driving unit, and the driving unit itself may include a linear motor.

The third guide member 46 may be extended in a Z-axis direction. The third guide member 46 may be coupled with the second guide member 44, and reciprocate in the Y-axis direction along the second guide member 44. For this, the third guide member 46 may further include a driving unit, and the driving unit itself may be a linear motor.

The head member 48 may be coupled with the third guide member 46. The head member 48 may be reciprocate in the Z-axis direction along the third guide member 46. In addition, the head member 48 may include an suction plate (for example, a vacuum suction plate) for gripping a plurality of biochips, or tongs.

In the movement mechanism 40 configured as above, since the head member 48 is freely movable in the X-axis direction, the Y-axis direction, and the Z-axis direction, the biochip may be moved on the stamping jig 10 or the inverting mechanism 200, or may be readily pulled from the stamping jig 10 or the inverting mechanism 200.

Meanwhile, although not shown, the biochip stamping device 10 may include a controller. The controller may control operations of the above described inverting mechanism 200 and movement mechanism 40, and control components to be added to the biochip stamping device 10. The controller may be mounted on a side surface of the body 102, or to a compartment 106.

Hereinafter, the biochip used in the stamping device will be briefly described.

First, the biochip used in the stamping device will be described with reference to FIGS. 8 and 9.

As described in the background of the invention, the biochip may include a meta chip (hereinafter, referred to as a first biochip 310) and a data chip (hereinafter, referred to as a second biochip 320).

The first biochip 310 may include a plurality of wells 312. The well 312 may be formed at prescribed intervals in length and width directions of the first biochip 310, and have the same depth. New medicines for a drug test of living tissues or other drugs 410 may be injected to each of the plurality of wells 312.

The second biochip 320 may include a plurality of pillars 322. The pillars 322 may be formed at prescribed intervals in length and width directions of the second biochip 320, and may be protruded to have the same height.
The living tissues 420 (for example, liver cells, or the like) may be cultured in each of the pillars 322. For this, a structure in which the living tissues are easily attached to the pillar 322 may be formed on a surface of the pillar 322.

In this manner, the second biochip 320 and the first biochip 310 may be combined through a stamping operation as shown in FIG. 9.

However, in the stamping operation, the pillar 322 of the second biochip 320 and the well 312 of the first biochip 310 are required to be accurately matched, so that repeated manual stamping operations may not be easy. Also, since typical biochips 310 and 320 have the risk of being damaged, considerable care may be required when handling the biochips 310 and 320.

Under the consideration of this, according to the present embodiment, the stamping operation of the second biochip 320 and the first biochip 310 may be automated. In particular, according to the present embodiment, the stamping operations of the plurality of biochips 310 and 320 may be simultaneously performed, and also repeatedly performed, thereby improving accuracy and reliability of the drug test through the biochip.

Next, the stamping operation process according to the present embodiment will be described with reference to FIGS. 10 through 13.

1. Preparation of First Biochip

Preparation of the first biochip 310 may be realized by aligning the first biochip 310 in the stamping jig 10. For example, in the present embodiment, the first biochip 310 to which a new medicine is injected may be aligned in the stamping jig 10. Here, the first biochip 310 may be moved on the stamping jig 10 in a state of being attached to the head member 48 of the movement mechanism 40, and may be aligned by a guide pin 12 of the stamping jig 10.

Figure 10:
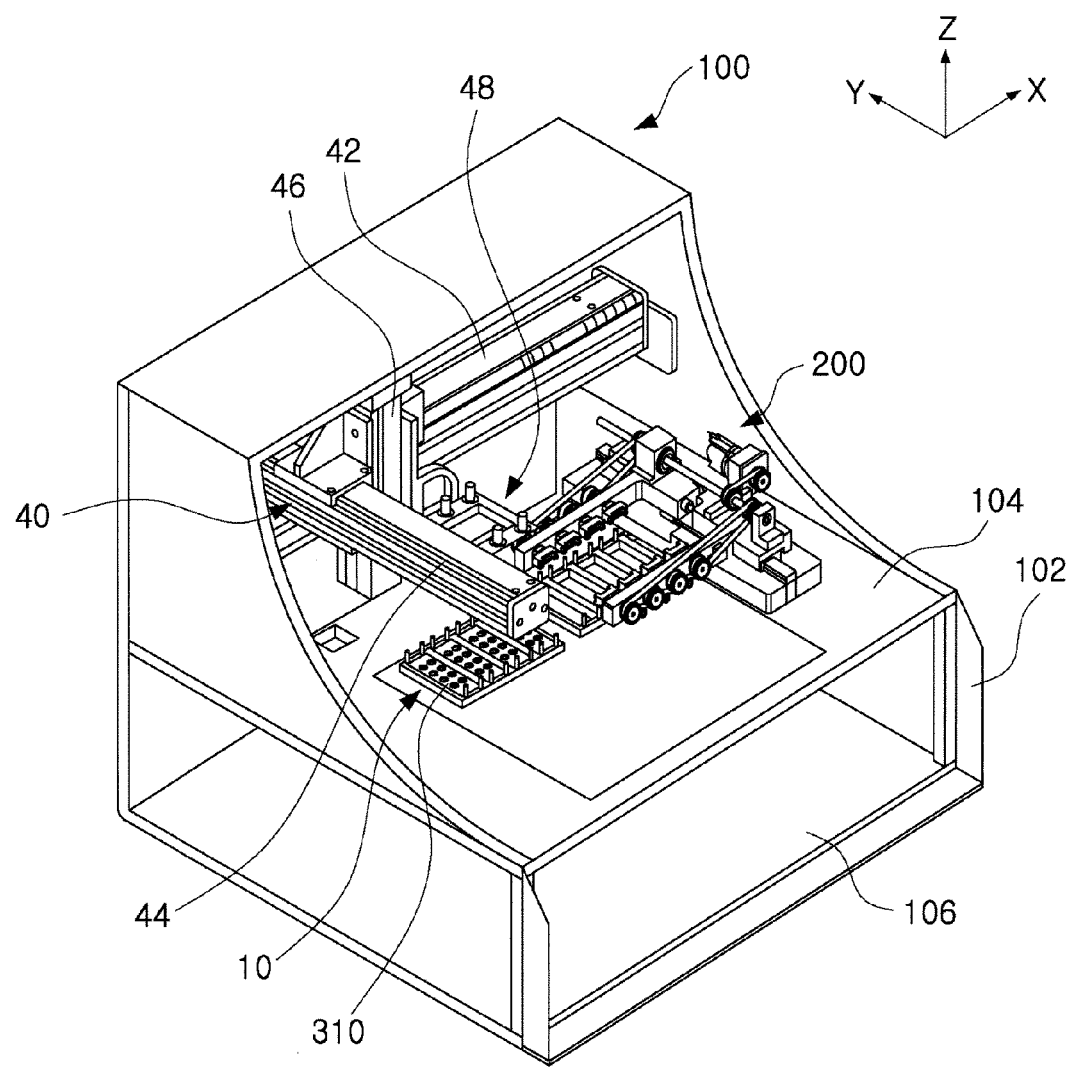
FIGS. 10 through 13 are views of a stamping operation through a biochip stamping device shown in FIG. 1.
Figure 11:
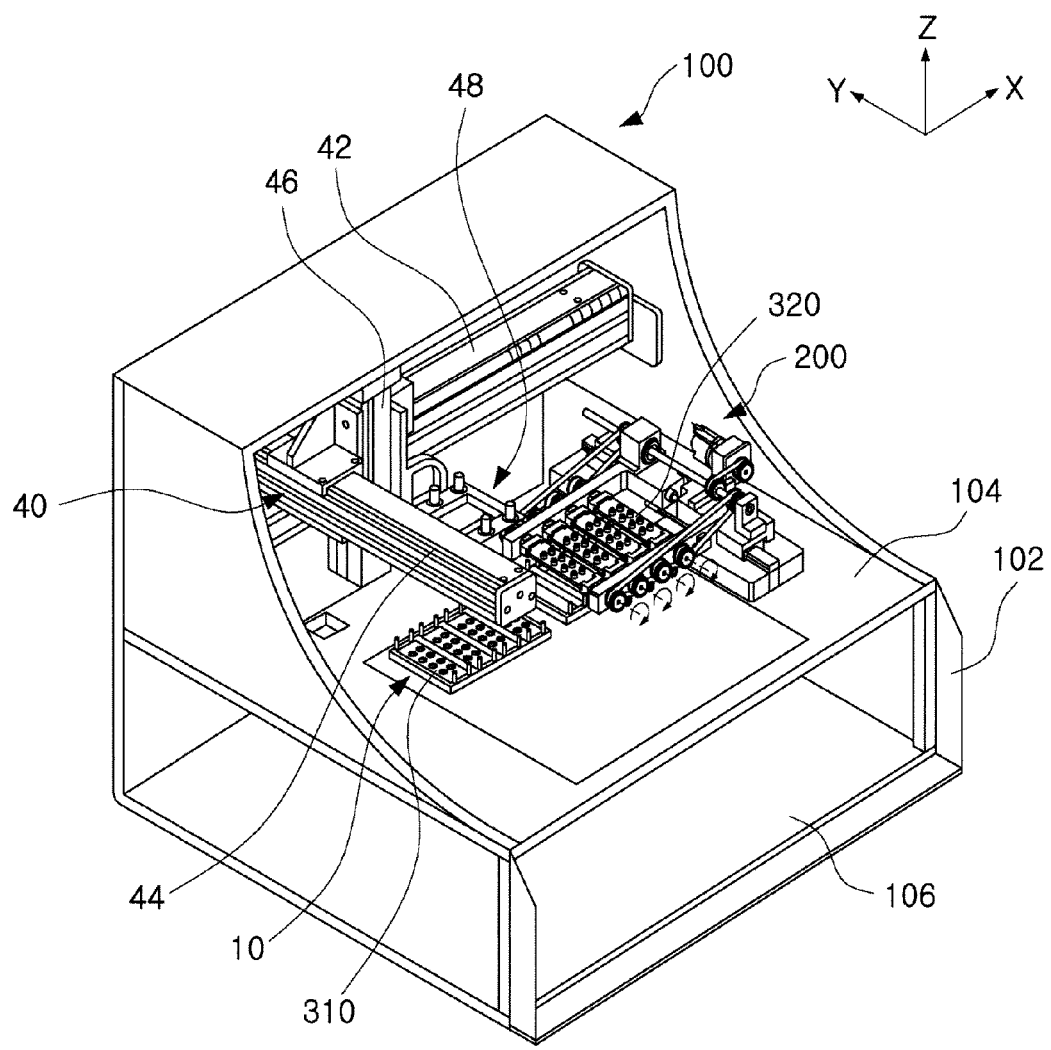
Figure 12:
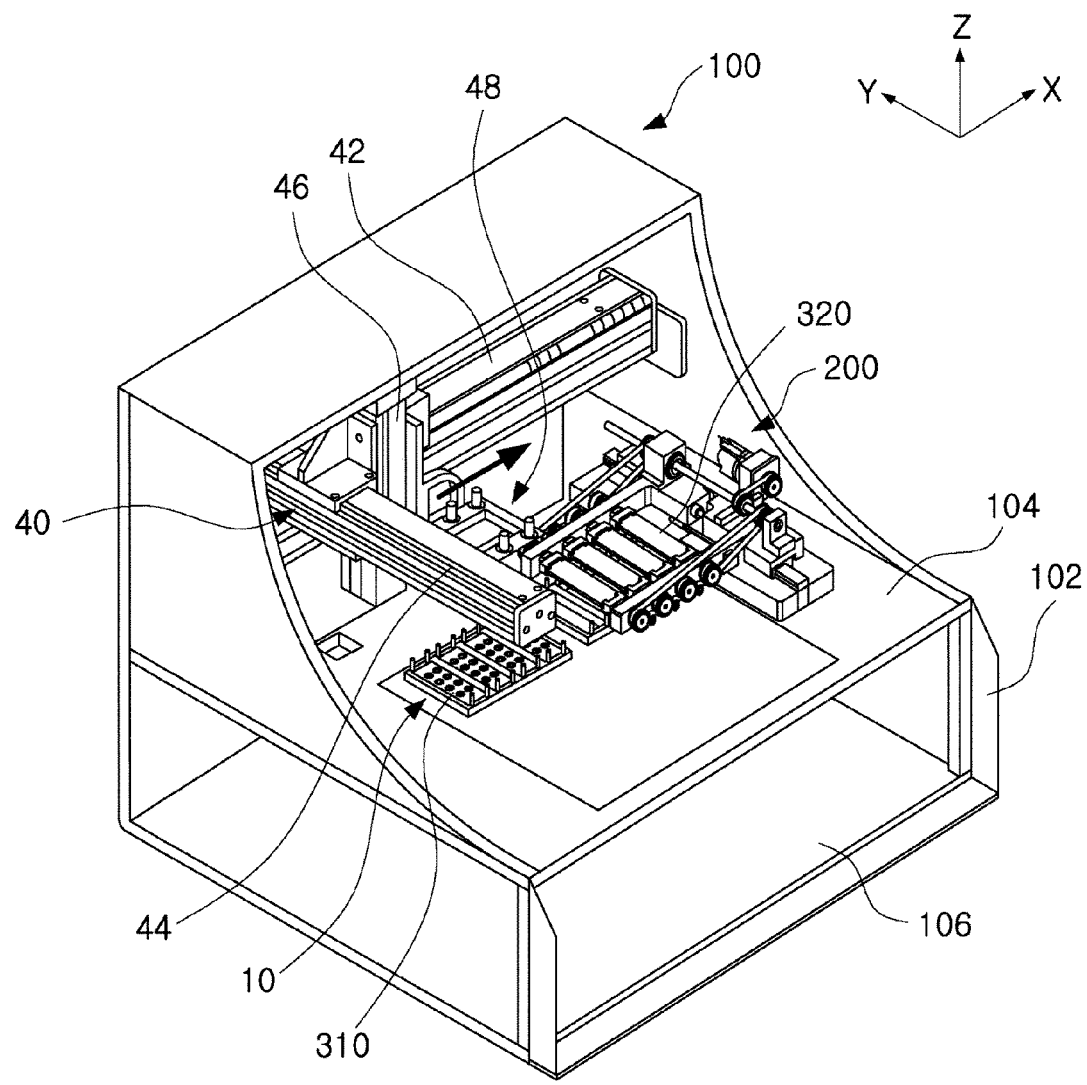
Figure 13:
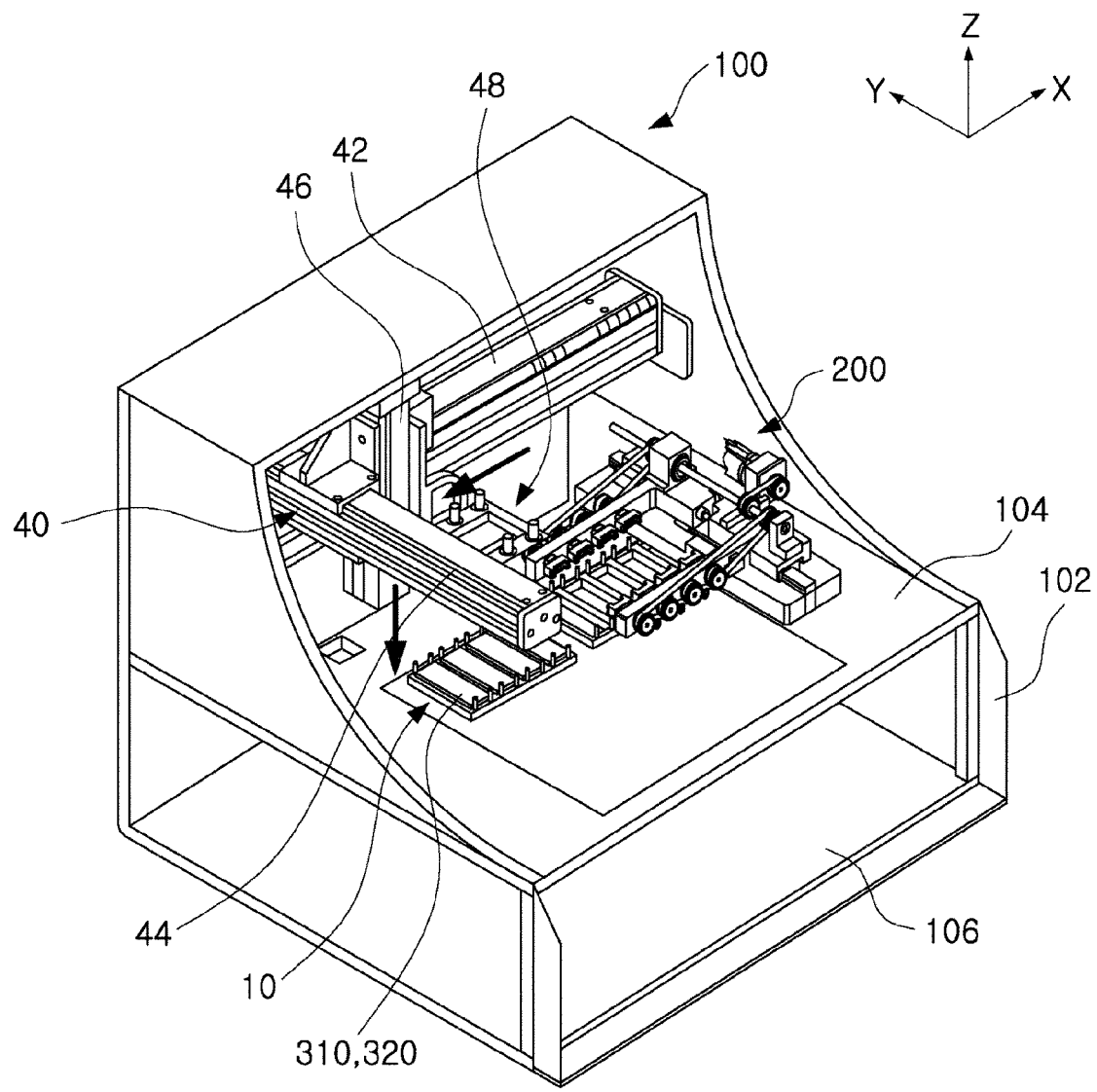

In FIG. 10, a plurality of first biochips 310 are aligned in the stamping jig 10; however, a single first biochip 310 may be aligned in the stamping jig 10 depending on the type of experiment.

2. Preparation of Second Biochip

Preparation of the second biochip 320 may be realized by preparing the second biochip 320 in the inverting mechanism 200. For example, in the present embodiment, the second biochip 320 in which living tissues are cultured may be disposed in the inverting mechanism 200. Here, the second biochip 320 may be moved from the outside or a magazine in which the biochips are stacked to the inverting mechanism 200, using the head member 48 of the movement mechanism 40. Alternatively, the second biochip 320 placed near the inverting mechanism 200 may be directly gripped by the inverting mechanism 200. The gripping method of the biochip by the inverting mechanism 200 may be the same as the above, and thus descriptions thereof will be omitted.

3. Vertical Inversion of Second Biochip

Vertical inversion of the second biochip may be realized by vertically inverting the second biochip 320. For example, in the present embodiment, the second biochip 320 may be vertically inverted in the inverting mechanism 200 by the driving of the driving motor 290. That is, when the driving motor 290 is operated, a driving force of the driving motor 290 sequentially may pass through the second belt 282, the third pulley 264, the second pulley 262, and the first belt 280 to thereby be transmitted to the first pulley 260, and the gripping member 240 may be rotated by rotation of the first pulley 260, so that the second biochip 320 may be vertically inverted.

An angle at which the second biochip 320 is vertically inverted may be adjusted by a sensor additionally configured to the inverting mechanism 200, or by a precise control of the driving motor 290.

4. Stamping

Stamping may be realized by stamping the first biochip 310 and the second biochip 320. For example, in the present embodiment, the vertically inverted second biochip 320 may be superimposed on the first biochip 310 of the stamping jig 10. Here, movement of the second biochip 320 may be automatically carried out by the movement mechanism 40.

For reference, a height of the second biochip 320 superimposed on the first biochip 310 may be determined by a geometrical structure of the biochip, or by precise control of the movement mechanism 40.

As described above, as for the stamping device and the stamping method according to the embodiments of the present invention, the stamping operation of the first biochip 310 and the second biochip 320 which includes the vertical inversion of the second biochip 320 may be performed en bloc through the inverting mechanism 200 and the movement mechanism 40. Accordingly, according to the present embodiment, the stamping operation may be repeatedly performed, and errors due to the repeated performance of the stamping operation may be significantly reduced.

Figure 14:
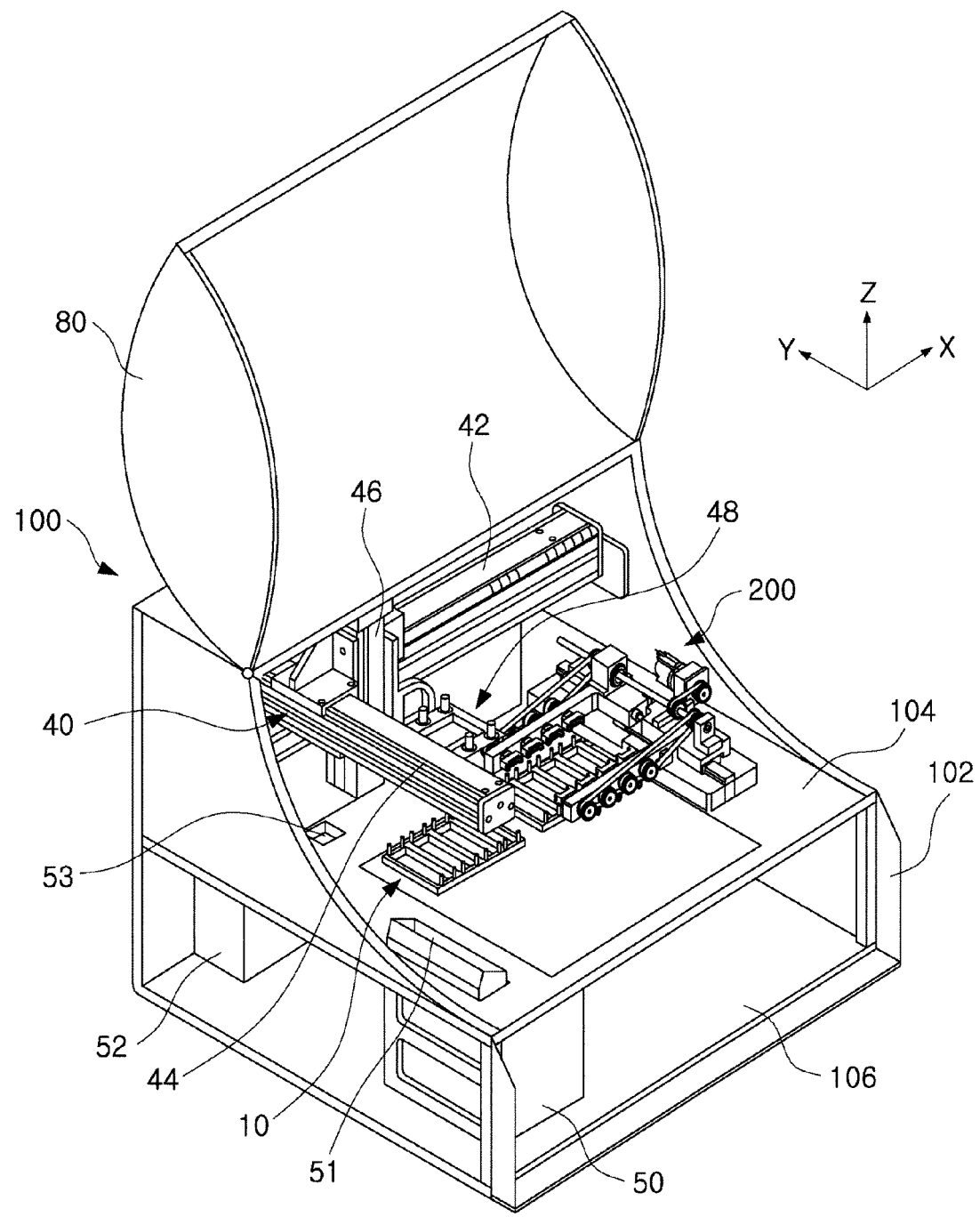
FIG. 14 is a perspective view of a biochip stamping device according to a second embodiment of the present invention.
Figure 15:
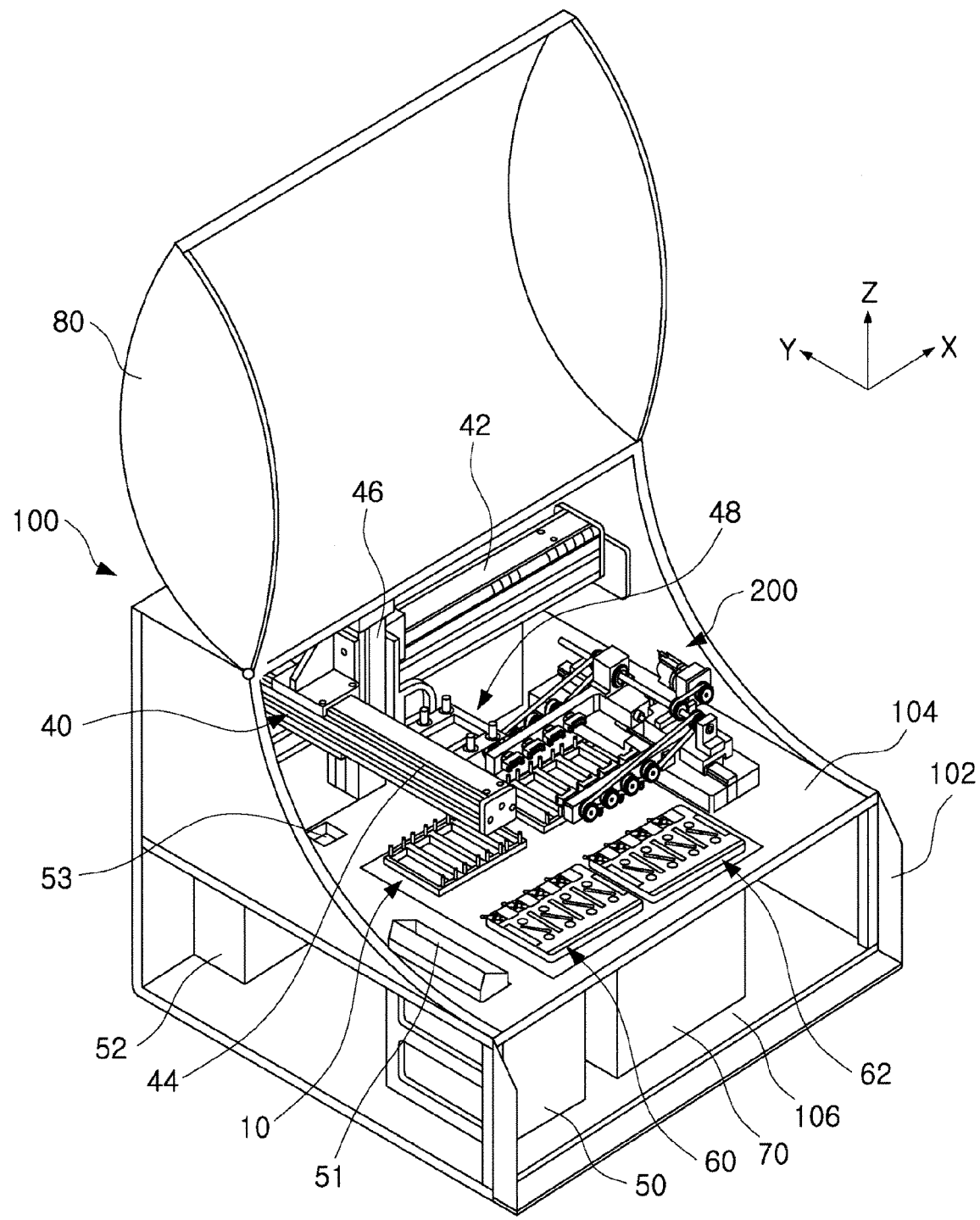
FIG. 15 is a perspective view of a biochip stamping device according to a third embodiment of the present invention.
Figure 16:
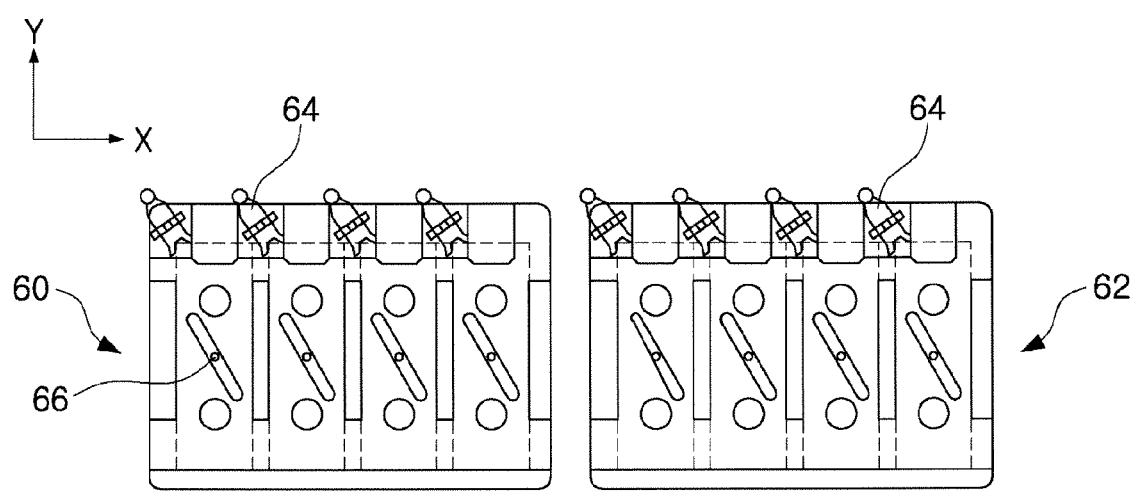
FIG. 16 is a plan view of a support shown in FIG. 15.

Next, another embodiment of the present invention will be described with reference to FIGS. 14 through 16. FIG. 14 is a perspective view of a biochip stamping device according to a second embodiment of the present invention, FIG. 15 is a perspective view of a biochip stamping device according to a third embodiment of the present invention, and FIG. 16 is a plan view of a support shown in FIG. 15.

The biochip stamping device 100 according to the second embodiment of the present invention may further include an air conditioner 50 and a cover 80.

As described above, the biochip may include living tissues. Accordingly, the biochip may be reacted very sensitively to the surrounding environment (particularly, temperature and humidity). For example, the biochip containing the living tissues may be easily dried or deformed in a dry environment.

Under the consideration of this, in the present embodiment, the air conditioner 50 and a humidifier 52 may be further included in the body 102 of the stamping device. Also, the cover 80 for protecting a stamping operation environment against the external environment may be further included in the body 102.

The air conditioner 50 may have an outlet 51 upwardly protruded from the flat plate 104, so that cooled or heated air may be provided toward a stamping operation space (a space over the flat plate 104). In addition, the humidifier 52 may be connected with a hole 53 formed in the flat plate 104, so that constant water vapor may be provided on the stamping operation space. Accordingly, according to the present embodiment, an inner space of the stamping device may be maintained for several hours to have an environment required for preserving the biochip.

The present embodiment configured as above may be appropriate for a case in which the stamping operations for the plurality of biochips are repeatedly performed.

The biochip stamping device 100 according to the third embodiment may further include supports 60 and 62 and a vacuum suction unit 70.

The stamping operation for the biochip may include an un-stamping operation for separating two superimposed biochips. However, since the two superimposed biochips are not easily separated from each other, it is difficult to separate the superimposed biochips.

Under the consideration of this, in the present embodiment, the biochip stamping device may further include supports 60 and 62 for keeping the biochips so as to simultaneously perform the stamping operation for the plurality of biochips, and the vacuum suction unit 70 may be mounted on or connected to the first support 60 or the second support 62.

The vacuum suction unit 70 may be connected with the first support 60 or the second support 62. Specifically, the vacuum suction unit 70 may form positive pressure or negative pressure in the first support 60 or the second support 62 through a hole 66 formed on the bottom of the first support 60 or the second support 62. For example, the vacuum suction unit 70 may generate the negative pressure in the hole 66 so as to firmly absorb and fix any one of the combined second biochip 320 and first biochip 310. Also, the vacuum suction unit 70 may generate the positive pressure in the hole 66 so as to easily discharge the first biochip 310 or the second biochip 320, placed on the first support 60 or the second support 62.

Meanwhile, the supports 60 and 62 may be formed on the flat plate 104 so that a plurality of biochips to be stamped are prepared. The supports 60 and 62 may be mounted near the outlet 51 of the air conditioner 50. In addition, the supports 60 and 62 may further include a clip 64 for fixing the biochips.

According to the present embodiment configured as above, the first biochip 310 or the second biochip 320 may be stably maintained on the supports 60 and 62 through the vacuum suction unit 70, so that the un-stamping operation of the second biochip 320 and the first biochip 310 may be easily performed.

As set forth above, according to the embodiments of the present invention, the stamping operation of the first biochip and the second biochip may be performed using automation equipment, thereby significantly reducing the frequency of the occurrence of working errors while the stamping operation is manually undertaken.

In addition, according to the embodiments of the present invention, errors due to the repeated performance of the stamping operation may be relatively insignificant in comparison with a manual process, thereby obtaining accurate and reliable experimental results through the repeated performance of the stamping operation.

In addition, according to the embodiments of the present invention, the stamping operation may be continuously performed, thereby rapidly performing the stamping operation of the biochip.

In addition, according to the embodiments of the present invention, the ambient temperature and humidity of the biochip may be maintained in the appropriate condition through the air conditioner, thereby effectively preventing cells or test drugs of the biochip from being deformed or deteriorated in the stamping operation or in the standby state for the stamping operation.

While the present invention has been shown and described in connection with the embodiments, it will be apparent to those skilled in the art that modifications and variations can be made without departing from the spirit and scope of the invention as defined by the appended claims.

What is claimed is:

1. A biochip stamping device, comprising:
a stamping jig having a first biochip aligned therein;
an inverting mechanism vertically inverting a second biochip; and
a movement mechanism transferring the vertically inverted second biochip on the stamping jig to combine the first biochip and the second biochip, wherein:
the inverting mechanism includes:
a fixing plate fixed on the biochip stamping device;
a pair of movable members mounted on the fixing plate, and movable in a direction thereof;
a plurality of gripping members rotatably mounted on the pair of movable members, and gripping the first biochip or the second biochip; and
a rotation unit rotating the plurality of gripping members.

2. The biochip stamping device of claim 1, wherein the stamping jig includes a guide pin for aligning a position of the first biochip and a position of the second biochip.

3. The biochip stamping device of claim 1, further comprising a cover preventing the first biochip and the second biochip from being contaminated by an external foreign substance.

4. The biochip stamping device of claim 3, further comprising an air conditioner adjusting an a temperature of the inside of the cover.

5. The biochip stamping device of claim 4, wherein the air conditioner includes a humidifier.

6. The biochip stamping device of claim 1, further comprising a first support and a second support on which the first biochip and the second biochip being on standby are respectively placed.

7. The biochip stamping device of claim 6, wherein the first support and the second support include a clip for fixing each of the first biochip and the second biochip.

8. The biochip stamping device of claim 6, wherein the first support or the second support includes a vacuum suction unit for fixing the first biochip.

9. The biochip stamping device of claim 1, wherein the movement mechanism includes:
   a first guide member formed in a first direction;
   a second guide member movable along the first guide member, and formed in a second direction perpendicular to the first direction;
   a third guide member movable along the second guide member, and formed in a direction perpendicular to each of the first guide member and the second guide member; and
   a head member movable along the third guide member, and picking up and moving at least one of the first biochip and the second biochip.

10. The biochip stamping device of claim 9, wherein the head member includes a suction unit for gripping of the biochip.

11. The biochip stamping device of claim 1, wherein the inverting mechanism includes:
   a gripping unit gripping the first biochip or the second biochip; and
   a driving unit vertically inverting the first biochip or the second biochip by rotating the gripping unit.

12. The biochip stamping device of claim 1, wherein the rotation unit includes:
   a first pulley rotatably mounted on the movable member; a second pulley mounted on each of the plurality of gripping members;
   a belt connecting the first pulley and the second pulley; and
   a driving motor rotating the first pulley.

\* \* \* \* \*